United States Patent Office 3,646,012
Patented Feb. 29, 1972

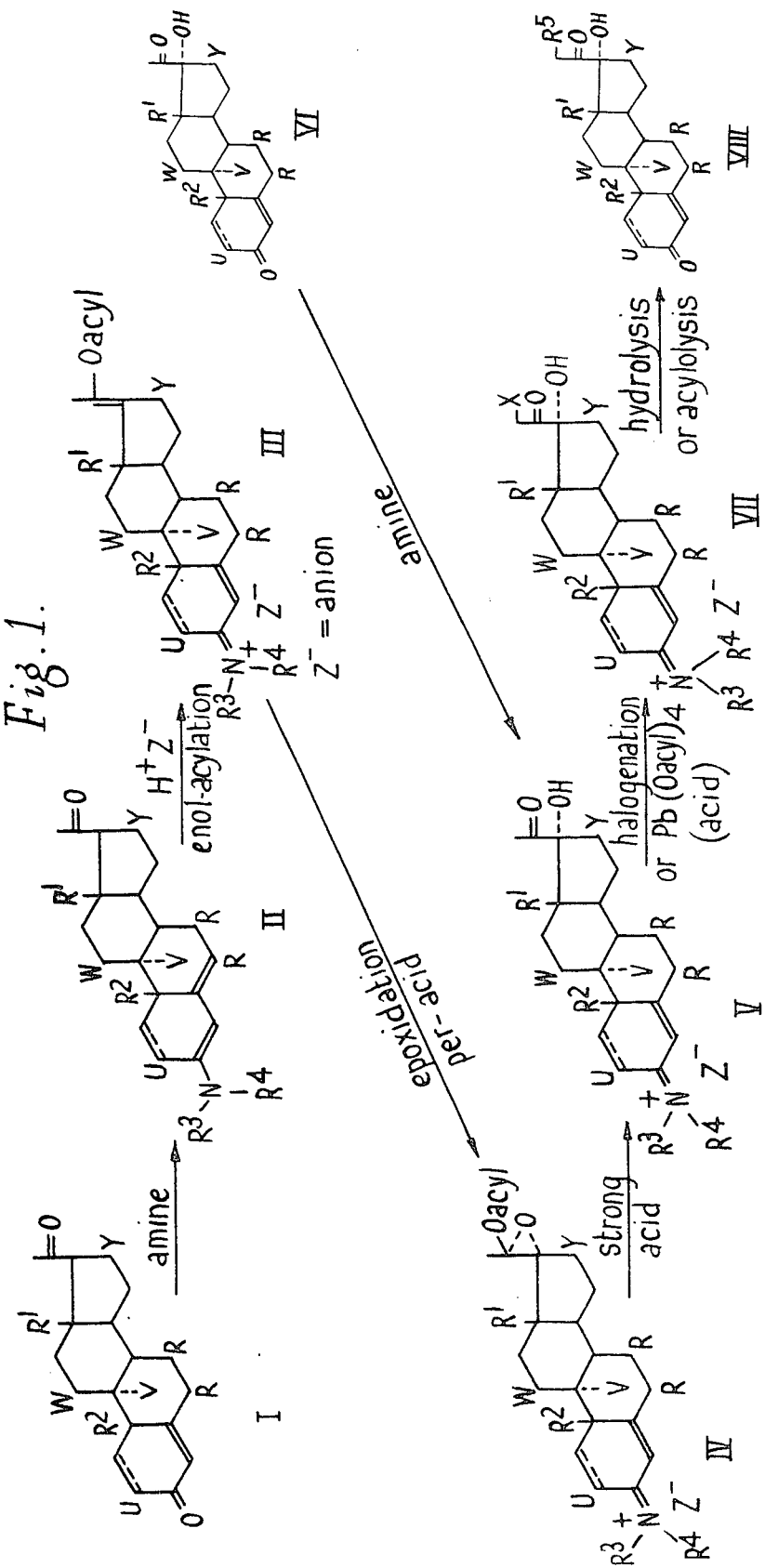

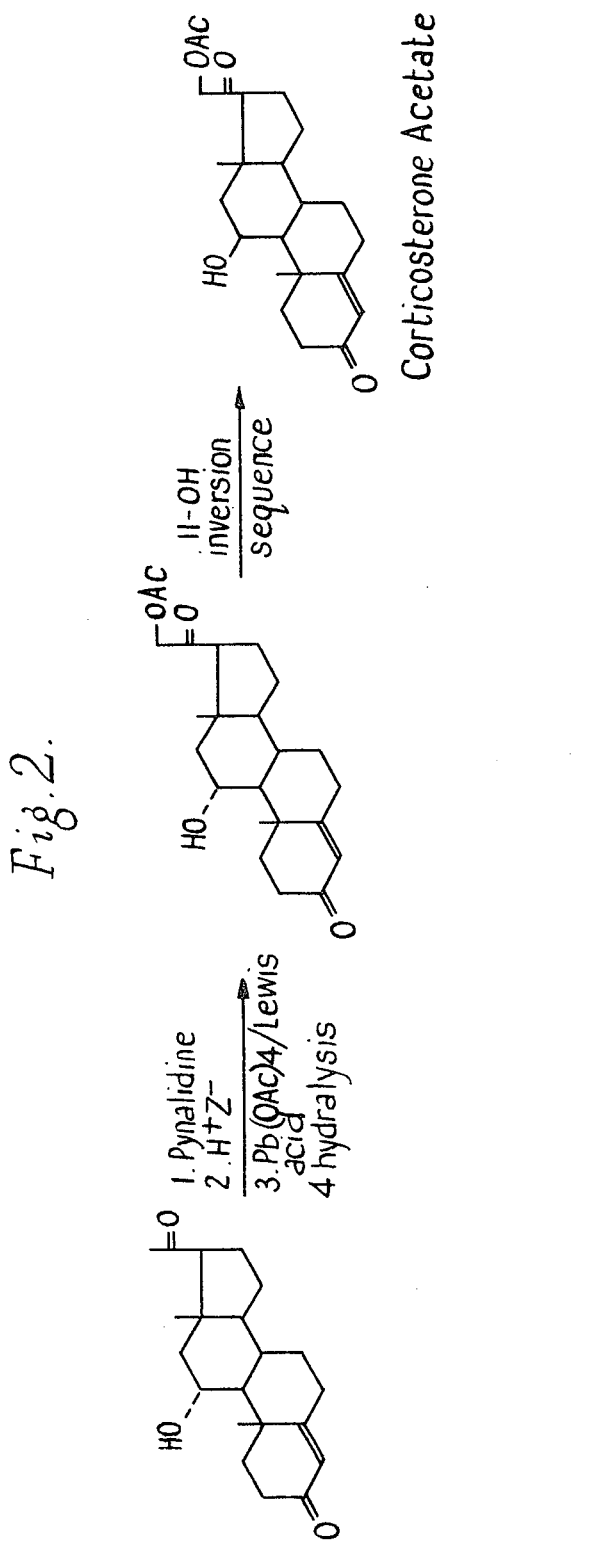

3,646,012
ENAMINE SALT PROTECTION OF STEROIDAL
α,β-UNSATURATED KETONES
Brian Gadsby, Maidenhead, England, and Michael R. G.
Leeming, Broomall, Pa., assignors to John Wyeth &
Brother Limited, Maidenhead, Berkshire, England
Filed Oct. 3, 1968, Ser. No. 764,705
Claims priority, application Great Britain, Oct. 5, 1967,
45,473/67; Mar. 22, 1968, 13,969/68
Int. Cl. C07c *173/00*
U.S. Cl. 260—239.5                                    12 Claims

ABSTRACT OF THE DISCLOSURE

The α,β-unsaturated ketonic grouping of a steroid having a second reactive site, such as a carbon-carbon double or triple bond or an enolizable ketonic group, is protected by formation of an eniminium salt. The resulting salt is then treated under neutral or acidic conditions with an electrophilic reagent reactive with said second reactive site by addition or substitution. Thereafter, the free α,β-unsaturated ketonic grouping is regenerated by alkaline hydrolysis, and a steroid modified by electrophilic reaction at said second reactive site is recovered.

---

This invention relates to the preparation of steroid ketone derivatives and it is concerned with the selective reaction of functional groups in the steroid molecule in the presence of a protected α,β-unsaturated ketone.

Such reactions are needed generally in the manufacture of steroids, particularly of corticoids in the elaboration of a 17α-hydroxy-17β-hydroxyacetyl system. In Fieser and Fieser, Steriods, 1959 (particularly chapter 19) and Djerassi, Steriod Reactions, 1963, (particularly chapter 13) (in conjunction with which books this specification should be read) are described methods of introducing α-hydroxy and α-acetyl groups. One of the most popular of these is the iodination of 20-ketones to introduce a 21-iodo and then a 21-acetoxy or hydroxy function. Although this method works in the presence of α,β-unsaturated ketones, as with the usual 3-keto-4-enes, it does not always give good yields. Another method involves lead tetraacetate but this reaction is not selective in the presence of a 3-keto-4-ene-system.

The purpose of the invention is to provide selective reactions in the presence of an α,β-unsaturated ketone, e.g. 20-oxo-16,17-enes, 11-oxo-8,9-enes and particularly 3-oxo-4-enes, which have been suitably protected, at another functional group in the molecule, particularly but not limited to a 20-carbonyl group or its functional derivatives in the production of corticoidal steroids.

It has been discovered that these purposes can be attained by protection of the α,β-unsaturated ketone as an enamine (eniminium) salt and that surprisingly such salts are inert under acid or approximately neutral conditions to a wide variety of electrophilic reagents, thereby permitting desired selective reactions.

Accordingly, the invention provides a process for the selective reaction under acid or approximately neutral conditions of an electrophilic reagent with a steroid having a functional group susceptible thereto in the presence of an α,β-unsaturated-ketone protected as an eniminium salt.

The α,β-unsaturated ketone can be protected by reaction with a primary or secondary amine to form the desired enamine which is converted to a salt, preferably with a strong acid (salts with acids of medium strength can also be used provided they are not unduly hydrolysed under reaction conditions). It is preferred to use a secondary amine in which the nitrogen atom forms part of a 5-membered ring, as in pyrrolidine and substituted pyrrolidines.

Electrophilic reactions can be performed on any functional group susceptible to them, such as ethylenic and acetylenic bonds, carbonyl groups and the functional derivatives of carbonyl groups, particularly ketals, hemithioketals, thioketals, enol-ethers and enol-ester groups. Thus ethylenic and acetylenic bonds can be reacted with halogens, halogen hydroacids and hypohalous acids, they can be hydrated, and epoxidised with per-acids and the epoxides opened with acid to introduce a hydroxy function. They can be hydroborated and they can be oxidised with a variety of reagents, e.g. chromic acid, permanganate, osmium tetroxide and ruthenium tetroxide. Electrophilic reactions which can be performed on carbonyl groups and their functional derivatives include halogenation and the like reactions in which the steroid is reacted with chlorine, bromine, iodine, bromine iodide and bromine chloride, with amine trihalides and with complex perhalides such as phenyltrimethyl ammonium bromide perbromide, such phosphorous trihalides, e.g. the tribormide, cyanogen bromide, halo-imides such as N-halo-succinimides (N-chlorosuccinimide, N-bromosuccinimide and N-iodosuccinimide) and the corresponding N-halo-acetamides, with sulfuryl halides and thionyl halides, tertiary-butoxy halides such as tertiary-butoxy chloride and with potassium perchlorate and cuprous halides such as cuprous bromide and cuprous chloride. It is to be understood that the term carbonyl group as used herein implies the presence of one or more adjacent carbon atoms so that reaction can take place by replacement of one or more hydrogen atoms on the α-carbon atom (or its vinylogous equivalent where there is α,β-unsaturation selectively unconverted to an eniminium salt).

Other reactions which can be performed are reactions involving oxidation of the α-carbon atom such as the introduction of an oxime residue with nitrous acid or an alkyl nitrite, or the reaction with selenium dioxide to introduce an α-oxo group or a α,β-ethylenic unsaturation and free radical reactions which in this context behave similarly to electrophilic reactions such as direct and allylic halogenation with halogen or halo-imides; in this specification the term "electrophilic" is to be understood to include such cases.

It will be appreciated that it is often convenient to convert a carbonyl group to a derivative group such as a ketal, hemithioketal, thioketal, enol-ether or enol-ester group followed by its halogenation or alternatively in the case of an enol-ester or enol-ester, by epoxidation and hydrolytic opening of the epoxide, e.g. with acid or base to introduce a hydroxy group. Also useful is the direct introduction of acetoxy residues α— to a carbonyl group with a lead tetra-acylate, e.g. lead tetra-acetate in the presence of an acid catalyst, for instance a Lewis acid such as boron trifluoride.

The process of the invention is particularly useful in the preparation of corticoidal steroids and exceptionally useful in the preparation of 19-norcorticoids, especially those with a polycarbonalkyl group at position 13 since considerable difficulties are often encountered with such steroids when the known reaction systems are employed. The process of the invention is particularly applicable to the preparation of such steroids in accordance with U.S. applications Ser. Nos. 602,763 and 602,785, all filed Dec. 19, 1966, now abandoned.

In this connection the invention is illustrated by the accompanying general reaction scheme (FIG. 1) in which R is hydrogen, halogen or alkyl particularly fluorine, chlorine, methyl or ethyl in the α- or β-configuration, $R^1$ is alkyl, e.g. methyl or lower polycarbonalkyl such as ethyl and n-propyl, $R^2$ is hydrogen or lower alkyl, particularly methyl, $R^3$ is hydrogen or an organic residue and $R^4$ is an organic residue preferably $R^3$ and $R^4$ are substituted or unsubstituted alkyl groups particularly preferred when joined together to form a 5-membered ring with the nitrogen atom, $R^5$ is hydroxy or acyloxy, U is hydrogen or lower alkyl, V is hydrogen, lower alkoxy or halogen particularly chlorine or fluorine, W is hydrogen, a hydroxy group or a protected hydroxy group in the α- or β-configuration, or an oxo group or protected oxo group as appropriate for the reactions contemplated (for protection of hydroxy and oxo groups see Djerassi, Steroid Reactions, chapter 1); X is halogen or acyloxy; Y is hydrogen or a lower alkyl, particularly methyl, hydroxy or protected hydroxy group in the α- or β-configuration (e.g. protected as an acetoxy group or as a 16,17-acetal or ketal group

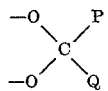

where P and Q are hydrogen, a substituted or unsubstituted hydrocarbon radical such as an alkyl, aryl, cycloalkyl or aralkyl radical which can be substituted with halogen, heterocyclyl or joined together to form a heterocyclic group, the 16α,17α-acetonide group is particularly preferred), oxo or protected or halogen in the α- or β-configuration and the dotted line in ring A indicates an optional 1,2-ethylenic bond.

The invention is further illustrated by the following example, which shows the 21-oxidation of a 17α-hydroxy-17β-acetyl side chain to the characteristic cortical side chain.

EXAMPLE 1

17α-hydroxy-3-(N-pyrrolidinyl)-pregna-3,5-dien-20-one

To a solution of 17α-hydroxyprogesterone (1 g.) in methanol (30 ml.) at 60° under nitrogen was added pyrrolidine (0.4 ml.). The resulting yellow solution was allowed to cool when pale yellow crystals were precipitated. Filtration gave the enamine (0.824 g.) M.P. 185°. A further quantity (130 mg.) of enamine was recovered on evaporation of the filtrate.

21-bromo-17α-hydroxy-3-(N-pyrrolidinium)-pregna-4-en-20-one bromide

To a stirred solution of the enamine (1 g.) in absolute ethanol (50 ml.) containing hydrogen bromide (0.76 g.) was added dropwise over 30 minutes a freshly prepared solution of bromine (0.19 ml.) in ethanol (10 ml.). Most of the solvent was removed in vacuo and the remainder diluted with ether (200 ml.) giving the title compound as a crystalline precipitate (1.415 g.) M.P. 269° dec.

21-bromo-17α-hydroxypregna-4-en-3,20-dione

The enamine salt (1.415 g.) in ethanol (100 ml.) and water (20 ml.) was treated with potassium carbonate (1 g.) and the solution was allowed to stand at room temperature for 1 hour. Most of the solvent was removed in vacuo and the remainder was diluted with water (200 ml.) giving a precipitate of the title compound (1.10 g.) M.P. 165° dec.

21-acetoxy-17α-hydroxypregna-4-en-3,20-dione

The bromoketone (1.10 g.) in acetone 50 ml. was treated with potassium acetate (2 g.) and the mixture heated under reflux in a stream of nitrogen for 4 hours. Most of the solvent was removed in vacuo and the remainder diluted with water (250 ml.) giving a crystalline precipitate of the title compound (0.794 g.).

Similar sequences of reaction can be performed with the 17α-hydroxy-17β-acetyl substrates of the above mentioned U.S. patent applications.

The 17α-hydroxyprogesterone 3-enamine used in the foregoing example can itself be prepared in accordance with the invention. Progesterone (or a substituted progesterone as noted above) is converted to its N-pyrrolidene-enamine, 3-(N-pyrrolidinyl)-pregna-3,5-dien-20-one similarly to the above reaciton of pyrrolidine with its 17α-hydroxy derivative. The enamine in the form of the eniminium salt is then enolacylated with an acylating agent under acid conditions, e.g. the enamine is reacted with acetic anhydride in the presence of perchloric acid to form the 17,20-en-20-ol acetate of the 3-enamine salt or converted first to the eniminium salt and then enol-acylated to the latter compound; this is epoxidised, e.g. with a per-acid, particularly an organic carboxylic per-acid such as permonophthalic acid or a haloperbenzoic acid and the epoxide hydrolysed with a strong e.g. mineral acid, e.g. sulphuric acid to give the desired 17α-hydroxy-3-(N-pyrrolidinyl)-pregna-3,5-dien-20-one which is brominated as in the foregoing example; or the epoxide is hydrolysed with a base with concomitant cleavage of the protecting group to give a 17-hydroxy-pregn-4-en-3,20-dione.

EXAMPLE 2

N-(20-oxopregn-4-en-3-ylidene)-pyrrolidinium perchlorate

A solution of 3-(N-pyrrolidinyl)-pregna-3,5-dien-20-one (3.8 g.) in ether (300 ml.) was treated with 1.1 equivalents of 72% aqueous perchloric acid and the white precipitate thus formed was collected, washed with ether and dried to give the required eniminium perchlorate (4.58 g., 95%). $\nu_{max.}$ (Nujol) 1700, 1655, 1610 cm.$^{-1}$.

N-(20-acetoxypregna-4,17-dien-3-ylidene)-pyrrolidinium perchlorate

The above perchlorate (4 g.), suspended in acetic anhydride (200 ml.) was treated with 72% perchloric acid. (0.3 ml.) and the mixture was stirred for 6 hr. at room temperature. The solvent was then removed in vacuo at 25° and the resulting solid was washed with ether and dried to leave the required enol acetate (4.14 g. 92%) M.P. 166–8° dec.

17α-hydroxypregn-4-ene-3,20-dione

To a solution of the above enol-acetate (2.165 g.) in benzene (400 ml.) was added m-chloroperbenzoic acid (1.5 g.) and the mixture was stirred at 25° for 16 hr. The solvent was evaporated in vacuo at <30° and the residual oil was extracted several times with ether to leave a light brown solid. This was dissolved in ethanol (200 ml.) and treated, in a nitrogen atmosphere, with 20 ml. of 2 N sodium hydroxide. The solution was left at 25° for ½ hr., then acidified with 2 N hydrochloric acid and most of the solvent was removed in vacuo. The residue was diluted with ether, washed with water, aqueous sodium bicarbonate and brine, dried ($MgSO_4$) and then evaporated to a semi-solid residue. The latter was crystallised from acetone to give 17α-hydroxypregn-4-ene-3,20-dione (655 mg. 48%).

The foregoing examples illustrate a simple and novel method for the elaboration of the cortical side chain from a 17-acetyl group and may be used to shorten already established synthetic routes to Reichstein's S acetate and thence to a wide variety of cortico-steroids or similarly with corresponding 16-substituted steroids, e.g. 16-methyl steroids to prepare betamethasone and dexamethasone and 16-hydroxy steroids to prepare triamcinolone and fluocinolone.

In a similar way to Example 1 or alternatively using acidic lead tetra-acetate for instance as shown below in Example 3, progesterone can be converted to desoxy-corticosterone acetate. The preparation from a pregn-4-en-3,20 - dione-3-enamine (which can be substituted as noted above) of a corresponding eniminium salt and introduction of a 21-acyloxy group with a lead tetraacylate and hydrolytic removal of the protecting group is now described in Example 3.

EXAMPLE 3

N-(21-acetoxy-20-oxo-pregn-4-en-3-ylidene)-pyrrolidinium methoxy-fluoroborate

To a solution of 3-(N-pyrrolidinyl)-pregna-3,5-dien-20-one (1.02 g.) in benzene (38 ml.) and methanol (2 ml.)

was added redistilled borontrifluoride etherate (7.5 ml.), followed by lead tetra-acetate (1.8 g.). The mixture was stirred at 25° under nitrogen for 4 hours and then poured onto ice-water and extracted with methylene chloride. The combined extracts were washed with water, dried (MgSO$_4$) and evaporated to a gum (1.34 g.). A sample of the latter was crystallised from ethanol to give (N-(21-acetoxy-20-oxopregn-4-en-3-ylidene)-pyrrolidinium methoxyfluoroborate, M.P. 225° dec. $\lambda_{max}$ 275.5 m$\mu$, $\epsilon$ 19,827 $\nu_{max}$ (Cl$_3$) 1745, 1720, 1618, 1060 cm.$^{-1}$ N.M.R. 3.65, (1 H, C–4), 5.23 d. (1 H, J=14 c./s.) (C–21) 5.43 d. (1 H, J=14 c./s., C–21), 5.98 m. (4H)

7.82 m. (3H, C–21, OAc), 8.8 1 s. (3H, C–10 Me.), 9.29 s. (3H, C–13 Me.). (Found (percent): C, 64.09; H, 8.13; B, 1.89; F, 10.88; N, 2.82. C$_{27}$H$_{40}$BF$_4$NO$_3$ requires (percent): C, 64.00; H, 8.25; B, 2.06; F, 10.85; N, 2.67.

21-acetoxypregn-4-ene-3,20-dione

To a solution of the above crude methoxyfluoroborate (1.23 g.) in ethanol (125 ml.) and water (10 ml.) was added saturated aqueous sodium bicarbonate (0.5 ml.) and the mixture was stirred under nitrogen for 2 hours at 25°. The solution was then made acid with dilute acetic acid and then evaporated almost to dryness in vacuo ($\not>$30°). The residue was then treated with water and extracted into methylene chloride. This extract was washed with water, dried (MgSO$_4$) and evaporated to a gum. The latter was eluted from a short column of Florisil with 10% acetone: methylene chloride and the product thus obtained was recrystallised from acetone-petrol to give 21-acetoxypregna-4-ene-3,20-dione (505 mg., 53%) M.P. 154–6°. $\lambda_{max}$ 241.4 m$\mu$. $\epsilon$ 15,115.

Similar reaction sequences to those shown in the foregoing examples can be carried out in the presence of an 11-hydroxy group for instance to prepare corticosterone acetate (e.g. as shown in FIG. 2) or hydrocortisone (e.g. as shown in FIG. 1, starting with I where W=11$\alpha$—OH through II, III, IV, V, VII, to VIII and thence by standard inversion procedures to hydrocortisone or its acetate D=11$\beta$—OH, equally I where W=11$\beta$—OH can be taken directly to hydrocortisone or its acetate VIII [other symbols R, R$^1$, R$^2$, R$^3$, R$^4$, R$^5$, U, V, W, X and Y having appropriate values]).

Similarly electrophilic reactions, e.g. hypobromous acid and subsequent epoxide formation or per-acid epoxidation of 9,11-ethylenic steroids while the 3-keto-4-ethylenic system is protected in accordance with the invention leads through the 9$\beta$,11$\beta$-epoxides and treatment with a halogen hydracid, e.g. hydrofluoric acid, to the highly active 9$\alpha$-halo corticoidal steroids, particularly the 9$\alpha$-fluoro steroids.

EXAMPLE 4

3-(N-pyrrolidinyl)-16$\beta$-methylpregna-3,5-dien-20-one

To a solution of 16$\beta$-methylpregn-4-en-3,20-dione (prepared by reaction of 3$\beta$-acetoxy-pregna-5,16-dien-20-one with diazomethane in ether and pyrolysis of the resulting pyrazoline at about 210° under reduced pressure to give 3$\beta$-acetoxy-16-methylpregn-3,16-dien-20-one followed by catalytic hydrogenation with a palladium or charcoal catalyst as in U.K. Pat. 881,334 to give 3$\beta$-acetoxy-16$\beta$-methylpregn-5-en-20-one, hydrolysis to the 3-ol and chromic acid or Oppenauer oxidation) (3 g.) in methanol (45 ml.) at 60° C. under nitrogen is added pyrrolidine (1 ml.) and the solution is allowed to cool. The yellow crystals of the title compound so formed are collected and dried.

N-(20-oxo-16$\beta$-methylpregn-4-en-3-ylidene) pyrrolidinium perchlorate

A solution of 3-(N-pyrrolidinyl)-16$\beta$-methylpregna-3, 5-dien-20-one (2.7 g.) in ether (250 ml.) is treated with 72% aqueous perchloric acid (1.1 ml.) and the white precipitate thus formed is collected, washed with ether and dried giving the title compound.

N-(20-acetoxy-16$\beta$-methylpregna-4,17-dien-3-ylidine) pyrrolidinium perchlorate A suspension of N-(20-oxo-16$\beta$-methylpregn-4-en-3-ylidine)pyrrolidinium perchlorate (1.8 g.) in acetic anhydride (100 ml.) is treated with 72% aqueous perchloric acid (0.1 ml.) and the mixture is stirred overnight at room temperature. The solvent is removed in vacuo at room temperature and the residue is washed well with ether leaving the title compound as a brown solid.

17$\alpha$-hydroxy-16$\beta$-methylpregn-4-ene-3,20-dione

To a solution of N-(20-acetoxy-16$\beta$-methylpregn-4,17-dien-3-ylidine)-pyrrolidinium perchlorate (2.3 g.) in benzene (500 ml.) is added m-chloroperbenzoic acid (1.8 g.) and the solution is stirred overnight at room temperature. The solvent is removed in vacuo at room temperature and the residue is extracted several times with ether leaving a brown solid. This is dissolved in ethanol (200 ml.) and treated under nitrogen with 2 N sodium hydroxide (20 ml.) After ½ hour at room temperature 2 N hydrochloric acid (30 ml.) is added and most of the solvent is removed in vacuo and the residue is extracted with ether. The extracts are washed with water, aqueous sodium bicarbonate and brine, dried over magnesium sulphate, then evaporated to give a solid residue. This is recrystallized from acetone to give the title compound.

17$\alpha$-hydroxy-16$\beta$-methylpregn-4-en-3,20-dione is converted by the method of Example 1 to 21-acetoxy-17$\alpha$-hydroxy-16$\beta$-methylpregn-4-en-3,20-dione and is subjected to microbiological oxidation in conventional manner to introduce an 11-hydroxy group. Dehydration with p-toluene sulphonyl chloride in pyridine, treatment of the resulting 9,11-dehydro compound with hypobromous acid and with base to form the 9$\beta$,11$\beta$-epoxide and then with hydrogen fluoride to introduce 9$\alpha$-fluoro and 11$\beta$-hydroxy groups and finally dehydrogenation with 2,3-dichloro-5, 6-dicyano-1,4-benzoquinone (D.D.Q.) to introduce a 1-double bond affords betamethasone, 16$\beta$-methyl-11$\beta$,17$\alpha$, 21-trihydroxypregna-1,4-dien-3,20-dione.

EXAMPLE 5

3-hydroxypregna-5,16-dien-20-one is treated with methyl magnesium iodide in tetrahydrofuran in the presence of a 1,4-addition promoting reagent, e.g. cuprous chloride, to give 3-hydroxy-16$\alpha$-methylpregn-5-en-20-one. This compound is oxidised to 3-hydroxy-16$\alpha$-methylpregn-4-en-3, 20-dione with chromic acid or Oppenauer reagent and this diketone is successively hydroxylated at positions 17 and 21 as in Example 4 to give 21-acetoxy-17$\alpha$-hydroxy-16$\alpha$-methylpregn-4-en-3,20-dione which is in turn converted by the sequence of reactions outlined in Example 4 to dexamethasone.

EXAMPLE 6

3-(N-pyrrolidinyl)-pregna-3,5,16-trien-20-one

To a solution of pregna-4,16-dien,3,20-dione (prepared by chromic acid oxidation of 3-hydroxypregna-5, 16-dien-20-one) (5 g.) in methanol (75 ml.) at 60° under nitrogen is added pyrrolidine (1.5 ml.) and the solution is allowed to cool to room temperature. The crystals so formed are removed and dried giving the title compound.

N-(20-oxopregna-4,16-dien-3-ylidine)pyrrolidinium chloride

To a solution of 3-(N-pyrrolidinyl)-pregna-3,5,16-trien-20-one (4.6 g.) in ether (100 ml.) is added an excess of ethereal hydrogen chloride. The white precipitate so formed is collected, washed with ether and dried giving the title compound.

N-(16$\alpha$,17$\alpha$-dihydroxy-20-oxopregn-4-en-3-ylidine)pyrrolidinium chloride To a solution of N-(20-oxopregna-4,16-dien-3-ylidine)- pyrrolidinium chloride (3.8 g.) in dry t-butanol (200 ml.) is added osmium tetroxide (100 mg.) followed by 30% hydrogen peroxide (50 ml.) added over 1 hour. The solution is allowed to stand at room temperature for 3 hours when most of the solvent is removed in vacuo. The residue is extracted with methylene chloride and the extracts are washed with 20% aqueous sodium sulphite, and brine, then dried over magnesium sulphate. Evaporation in vacuo gives a dark oil which is crystallised from methanol/ether to give the title compound.

N-(21-bromo-16α,17α-dihydroxy-20-oxopregn-4-en-3-ylidine)pyrrolidinium chloride

To a solution of N-(16α,17α-dihydroxy-20-oxopregn-4-en-3-ylidine)pyrrolidinium chloride (1.8 g.) in ethanol (50 ml.) containing hydrogen chloride (0.5 g.) is added over ½ hour a freshly prepared solution of bromine (0.4 ml.) in ethanol (10 ml.). Most of the solvent is removed in vacuo and the remainder is diluted with ether giving a crystalline precipitate of the title compound.

21-bromo-16α,17α-dihydroxypregn-4-ene-3,20-dione

To a solution of N - (21 - bromo - 16α,17α - dihydroxy-20 - oxopregn - 4 - en - 3 - ylidine)pyrrolidinium chloride (1.7 g.) in ethanol (25 ml.) is added sodium bicarbonate (0.5 g.) in water (5 ml.) and ethanol (20 ml.). After ½ hour, most of the solvent is removed in vacuo and the residue is extracted into ether. The extracts are washed with brine and dried over magnesium sulphate. Evaporation in vacuo gives a solid residue which is recrystallised from methanol giving the title compound.

This compound is subjected to microbiological oxidation in conventional manner to introduce a hydroxy group and the product is reacted with acetone in the presence of an acid catalyst to form the 16α,17α-acetonide. Successive treatment with p-toluene-sulphonyl chloride in pyridine to form a 9,11-double bond, hypobromous acid to give the 9α-bromo-11β-ol, base (sodium acetate) to form the 9β,11β-epoxide, hydrogen fluoride to form the 9α-fluoro-11β-hydroxy compound, strong alkali to hydrolyse the 21-acetoxy groups to a 21-hydroxy group and DDQ to introduce a 1-double bond affords triamcinolone.

EXAMPLE 7

3-(N-pyrrolidinyl)-androsta-3,5,9(11)-trien-17β-ol

To a solution of 17β - hydroxyandrosta - 5,9(11) - dien-3-one (1 g.) in methanol (25 ml.) at 60° under nitrogen is added pyrrolidine (0.5 ml.). The solution is allowed to cool to room temperature and the pale yellow crystals so formed are collected by filtration. These are recrystallised from methanol to give the title compound.

3-(N-pyrrolidinium)-androsta-4,9(11)-dien-17β-ol chloride

To a solution of 3 - (N - pyrrolidinyl) - androsta-3,5,9(11) - trien - 17β - ol (2 g.) in ether (150 ml.) is added with stirring an excess of etheral hydrogen chloride. The white precipitate of the title compound is collected by filtration.

11α,17β-dihydroxyandrost-4-en-3-one

To a solution of 3 - (N - pyrrolidinium) - androsta-4,9(11) - dien - 17β - ol chloride (2 g.) in dry tetrahydrofuran (200 ml.) is added a 2 N solution of diborane in tetrahydrofuran (15 ml.). The resulting solution is stirred at room temperature for 20 hours. Water (10 ml.) is added cautiously followed by 2 N sodium hydroxide (30 ml.) and the resulting mixture is stirred and heated under reflux for ½ hour. After cooling, the organic layer is separated, washed with brine until neutral then dried over magnesium sulphate. Filtration and evaporation in vacuo gives an oil which crystallises from methanol giving the title compound.

EXAMPLE 8

9α,11α,17β-trihydroxyandrost-4-en-3-one

To a solution of 3 - (N - pyrrolidinium) - androst-4,9(11) - dien - 17β - ol chloride (2.5 g.) in methylene chloride (55 ml.) is added osmium tetroxide (1.9 g.) and the solution is allowed to stand at room temperature for 3 days. The black precipitate thus formed is collected and dissolved in ethanol (150 ml.) containing sodium bicarbonate (0.5 g.) and water (20 ml.). Hydrogen sulphide is passed into the solution until all precipitation ceases. The precipitate is removed and the filtrate evaporated to a small volume (ca. 20 ml.) in vacuo, then extracted with ether. The extracts are washed well with water then dried over magnesium sulphate. Filtration and removal of the solvent in vacuo leaves a dark solid which is recrystallised from ethyl acetate giving the title compound.

EXAMPLE 9

3-(N-pyrrolidinium)-16-oximinoandrost-4-en-17-one chloride

To a cooled solution of 3 - (N - pyrrolidinium)-androst - 4 - en - 17 - one chloride (5 g.) in absolute ethanol (200 ml.) containing hydrogen chloride (0.4 g.) is added isoamyl nitrite (7.3 g.). The solution is then allowed to stand at room temperature overnight. The solvents are removed in vacuo, leaving a crystalline solid. This is recrystallised from methanol giving the title compound.

Androst-4-en-3,16,17-trione

A solution of 3 - (N - pyrrolidinium) - 16 - oximinoandrost - 4 - en - 3,17 - dione chloride (3.5 g.) in ethanol (200 ml.) containing water (25 ml.) sodium bicarbonate (0.5 g.) and sodium pyrosulphite (1.7 g.) is heated under reflux for 3 hours. Most of the solvent is then removed in vacuo and the residue is extracted with ether. The extracts are washed with brine and dried over magnesium sulphate. Filtration and evaporation in vacuo gives a semi-crystalline solid which gives the title compound on recrystallisation from acetone.

EXAMPLE 10

11β,17-dihydroxy-18-methyl-19-nor-3(N-pyrrolidinyl)-pregnan-3,5-dien-20-one

Pyrrolidine (0.5 ml.) O was added to a solution of 11β,17 - dihydroxy - 18 - methyl - 19 - norpregn - 4 - en-3,20-dione prepared according to United Kingdom application 57,494/67 (407 mg.) in methanol (25 ml.) and tetrahydrofuran (25 ml.), and the mixture was stirred under nitrogen at 60° for 10 minutes. The resulting pale yellow solution was cooled and evaporated in vacuo to an oil which crystallised on trituration with methanol. The crystalline product was filtered, washed with ether and dried in vacuo to give the solvated dienamine (431 mg., 92%) M.P. 216–7° dec. $\lambda_{max}$ 278 m$\mu$, $\epsilon$, 19,900.

Calcd. for $C_{25}H_{37}NO_3$ (percent): C, 72.35; H, 9.58. Found (percent): C, 72.31; H, 9.61.

N-(21-bromo-11β,17-dihydroxy-18-methyl-19-nor-21-oxo-pregna-4-en-3-ylidene)pyrrolidinium bromide The above dienamine (411 mg.) was dissolved with stirring, in ethanolic hydrogen chloride (20 ml.). To this solution was added a freshly prepared solution of bromine (0.11 ml.) in ethanol (4 ml.) during 30 minutes at 25°. The resulting mixture was stirred for a further 10 minutes and the precipitate thus formed was filtered and washed with ether to give the required title pyrrolidinium bromide (395 mg., 62.5%) M.P. 260° $\lambda_{max}$ 279.3 m$\mu$, $\epsilon$, 23,800. 3300; 1715; 1615.

21-acetoxy-11β,17-dihydroxy-18-methyl-19-norpregnan-4-en-3,20-dione

The above bromoketone (169 mg.) was dissolved in acetone (30 ml.) and heated under reflux with potassium acetate for 4 hours. The mixture was evaporated in vacuo and treated with water and methylene chloride. The organic layer was separated and evaporated to a brown oil. The latter slowly crystallised and was recrystallised from acetone/petrol to give the required 21-acetate (55 mg.) M.P. 225–8° $\lambda_{max}$ 242.5 m$\mu$, $\epsilon$ 15,770, 1747, 1738, 1720, 1650, 1610.

We claim:

1. A process for the preparation of a steroid of general formula

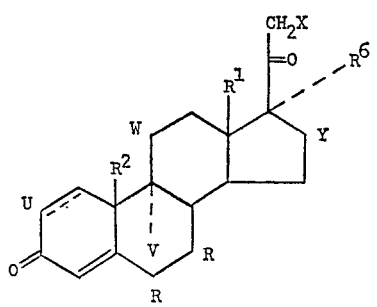

in which R is hydrogen, halogen or lower alkyl, $R^1$ is lower alkyl, $R^2$ is hydrogen or lower alkyl, U is hydrogen or lower alkyl, V is hydrogen, lower alkoxy or halogen, W is hydrogen, a hydroxy group or protected hydroxy group or an oxo group or protected oxo group, X is a halogen, hydroxy or acyloxy group, Y is hydrogen, a lower alkyl group, a hydroxy or protected hydroxy group, an oxo or protected oxo group or a halogen atom and the dotted line in ring A indicates an optional 1,2-ethylenic bond and $R^6$ represents hydrogen or hydroxyl, in which a compound of general formula

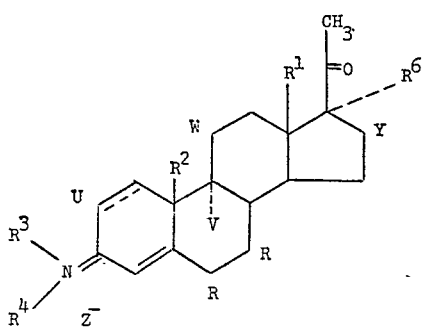

in which R, $R^1$, $R^2$, $R^6$, U, V, W, Y, and ring A are as defined above, $R^3$ and $R^4$ are organic residues and $Z^-$ is an anion, is subjected to treatment with a lead tetraacylate or, when $R^6$ is hydroxyl, to halogenation, the eniminium salt group is removed by alkaline hydrolysis, and the recovered 21-substituted steroid is thereafter converted, if desired, to a 21-acyloxy or 21-hydroxy derivative.

2. A 21 - halo-17-$\alpha$-hydroxy-3-(N-pyrrolidinium)-16-methylpregn-4-en-20-one salt.

3. A N-(21-halo-16$\alpha$,17$\alpha$-dihydroxy - 20 - oxopregn-4-en-3-ylidene)pyrrolidinium salt.

4. A process according to claim 1 for the preparation of steroids of the general formula:

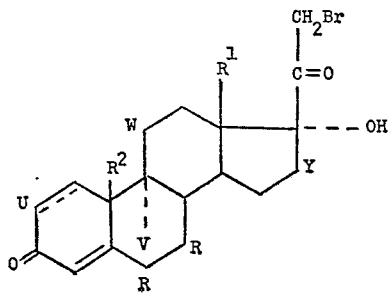

in which R is hydrogen, halogen or lower alkyl, $R^1$ is lower alkyl, $R^2$ is hydrogen or lower alkyl, U is hydrogen or lower alkyl, V is hydrogen, lower alkoxy or halogen, W is hydrogen, hydroxyl, protected hydroxyl, oxo or protected oxo group, Y is hydrogen, halogen, lower alkyl, hydroxyl, protected hydroxyl, oxo or protected oxo and the dotted line in ring A indicates an optional 1,2-ethylene bond, which process comprises the steps of reacting a steroid of formula

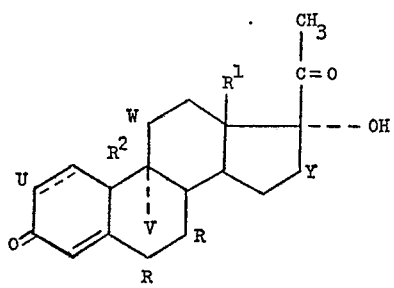

with at least an equivalent amount of a secondary amine to form an enamine derivative of the $\Delta^4$-3-ketonic group, converting said enamine to an eniminium salt by addition of at least an equivalent amount of a strong acid, subjecting the said eniminium salt in an acidic reaction medium to treatment with bromine and thereafter subjecting the eniminium salt product to alkaline hydrolysis to restore the $\Delta^4$-3-keto function and recovering a 21-bromo-$\Delta^4$-3-ketosteroid.

5. A process according to claim 4 in which the eniminium salt is the pyrrolidinium salt.

6. A process according to claim 4 in which the 21-bromo-$\Delta^4$-3-ketosteroid product is further converted into a 21-acyloxy-$\Delta^4$-3-ketosteroid by reaction with the alkali metal salt of an alkanoic acid.

7. A process according to claim 6 in which the starting steroid is 17$\alpha$-hydroxy-progesterone and the product obtained is 21-acetoxy-17$\alpha$-hydroxypregn-4-en-3,20-dione.

8. A process according to claim 6 in which the starting steroid is 11$\beta$,17 - dihydroxy-18-methyl-19-norpregn-4-en-3,20 - dione and the product is 21 - acetoxy-11$\beta$,17-dihydroxy-18-methyl-19-norpregn-4-en-3,20-dione.

9. A process according to claim 1 for the preparation of steroids of the general formula:

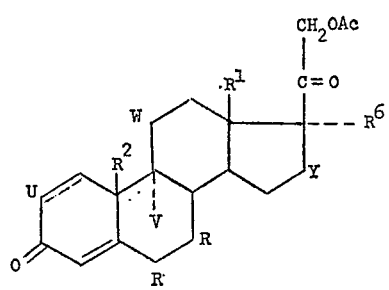

in which R is hydrogen, halogen or lower alkyl, $R^1$ is lower alkyl, $R^2$ is hydrogen or lower alkyl, $R^6$ is hydrogen or hydroxyl, U is hydrogen or lower alkyl, V is hydrogen, lower alkoxy or halogen, W is hydrogen, hydroxyl, protected hydroxyl, oxo or protected oxo group, Y is hydrogen, halogen, lower alkyl, hydroxyl, protected hydroxyl, oxo or protected oxo, Ac is an acetyl radical and the dotted line in ring A indicates an optional 1,2-ethylene bond, which process comprises the steps of reacting a steroid of formula

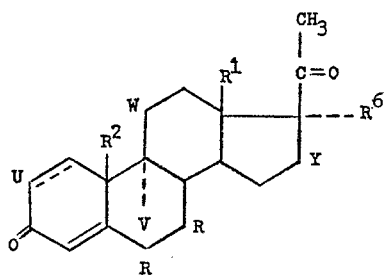

with at least an equivalent amount of a secondary amine to form an enamine derivative of the $\Delta^4$-3-ketonic group, converting said enamine to an eniminium salt by addition of at least an equivalent amount of a strong acid, subjecting the said eniminium salt in an acidic reaction medium to treatment with lead tetra-acetate, and thereafter subjecting the eniminium salt product to alkaline hydrolysis to restore the $\Delta^4$-3-keto function and recovering a 21-acetoxy-$\Delta^4$-3-ketosteroid.

10. A process according to claim 9 in which the eniminium salt is the pyrrolidinium salt.

11. A process according to claim 9 in which the 21-acetoxy-$\Delta^4$-3-ketosteroid product is further converted into a 21-hydroxy-$\Delta^4$-3-ketosteroid by hydrolysis.

12. A process according to claim 9 in which the starting steroid is progesterone and the product obtained is 21-acetoxypregn-4-en-3,20-dione.

References Cited
UNITED STATES PATENTS 3,444,160   5/1969   Walker _____ 260—239.5

ELBERT L. ROBERTS, Primary Examiner

U.S. Cl. X.R.

260—397.3, 397.4, 397.45, 397.47